United States Patent [19]

Warren

[11] Patent Number: 5,203,747
[45] Date of Patent: Apr. 20, 1993

[54] INTEGRATED HYDRO-MECHANICAL TRANSMISSION

[76] Inventor: Walter S. Warren, 14 Chapman Road, Winnipeg Manitoba, Canada, R2Y 1J8

[21] Appl. No.: 774,555

[22] Filed: Oct. 10, 1991

[51] Int. Cl.$^5$ .............................. F16H 47/04
[52] U.S. Cl. .................... 475/72; 475/82; 475/127; 475/143; 60/490; 418/21
[58] Field of Search .......... 475/72, 82, 83, 127, 475/143, 144; 60/490, 491, 492; 418/21

[56] References Cited

U.S. PATENT DOCUMENTS

| | | | |
|---|---|---|---|
| 2,463,950 | 3/1949 | Carroll | 60/491 X |
| 2,484,789 | 10/1949 | Hill et al. | 418/21 |
| 2,645,903 | 7/1953 | Elkins | 418/21 |
| 2,666,293 | 1/1954 | Vigneau | 418/21 |
| 3,345,885 | 10/1967 | Tschanz | 475/72 |
| 3,404,584 | 10/1968 | Trautmann | 475/72 |
| 4,646,521 | 3/1987 | Snyder | 60/491 |

FOREIGN PATENT DOCUMENTS

| | | | |
|---|---|---|---|
| 2646380 | 11/1990 | France | 475/83 |
| 58-46246 | 3/1983 | Japan | 475/72 |
| 8204599 | 6/1984 | Netherlands | 418/21 |

Primary Examiner—Allan D. Herrmann
Assistant Examiner—William O. Trousdell

[57] ABSTRACT

An integrated hydromechanical transmission capable of achieving continuous variability from maximum forward, through zero, to full reverse, and vice versa. The unit will achieve significantly higher rates of efficiency than current hydrostatic transmissions and, as well, has many other desirable characteristics. Intended for use in heavy-duty drive-wheel-steered and tracked vehicle applications such as hay windrowers, grain swathers, crawler tractors, military armoured vehicles, etc.

8 Claims, 6 Drawing Sheets

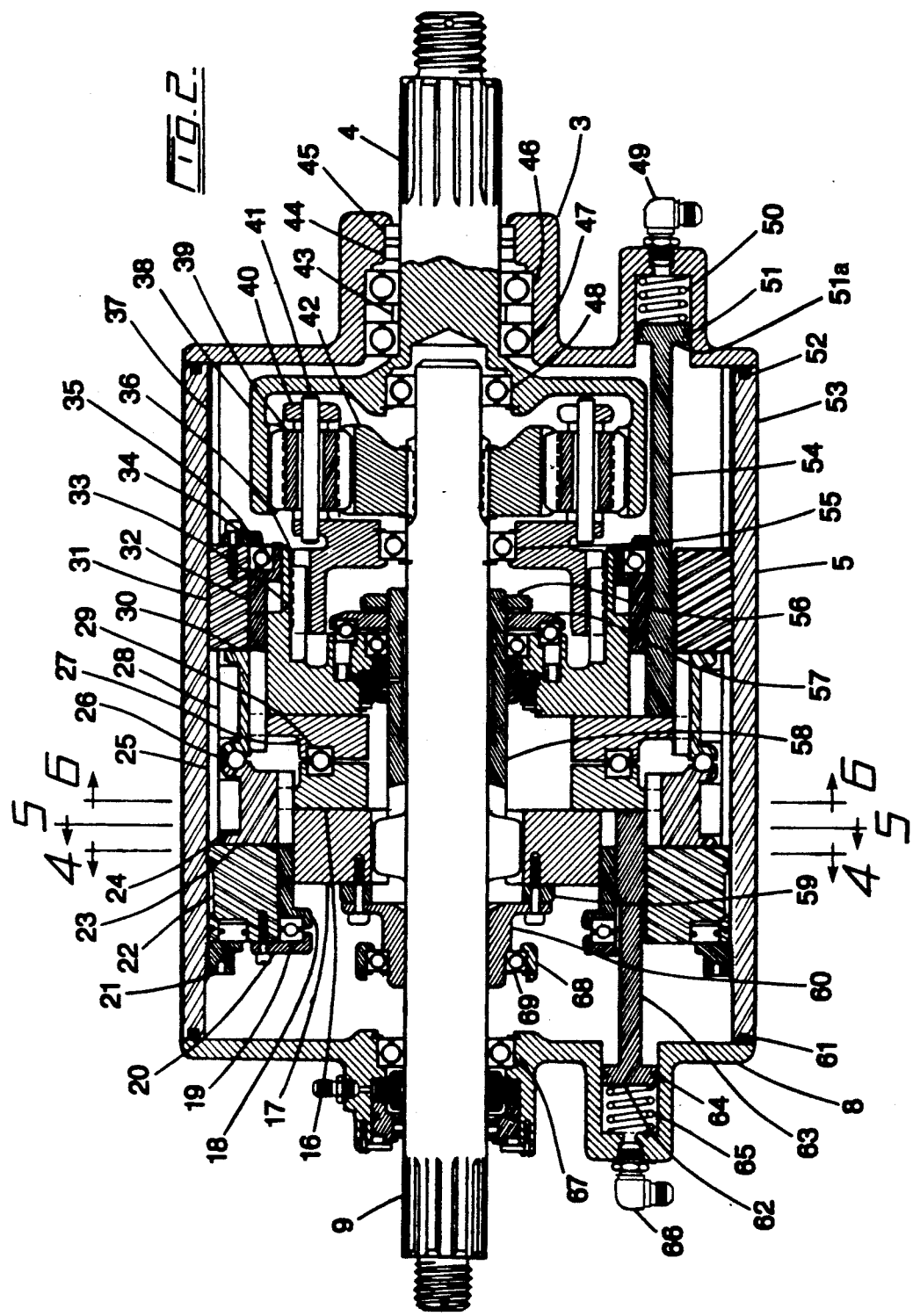

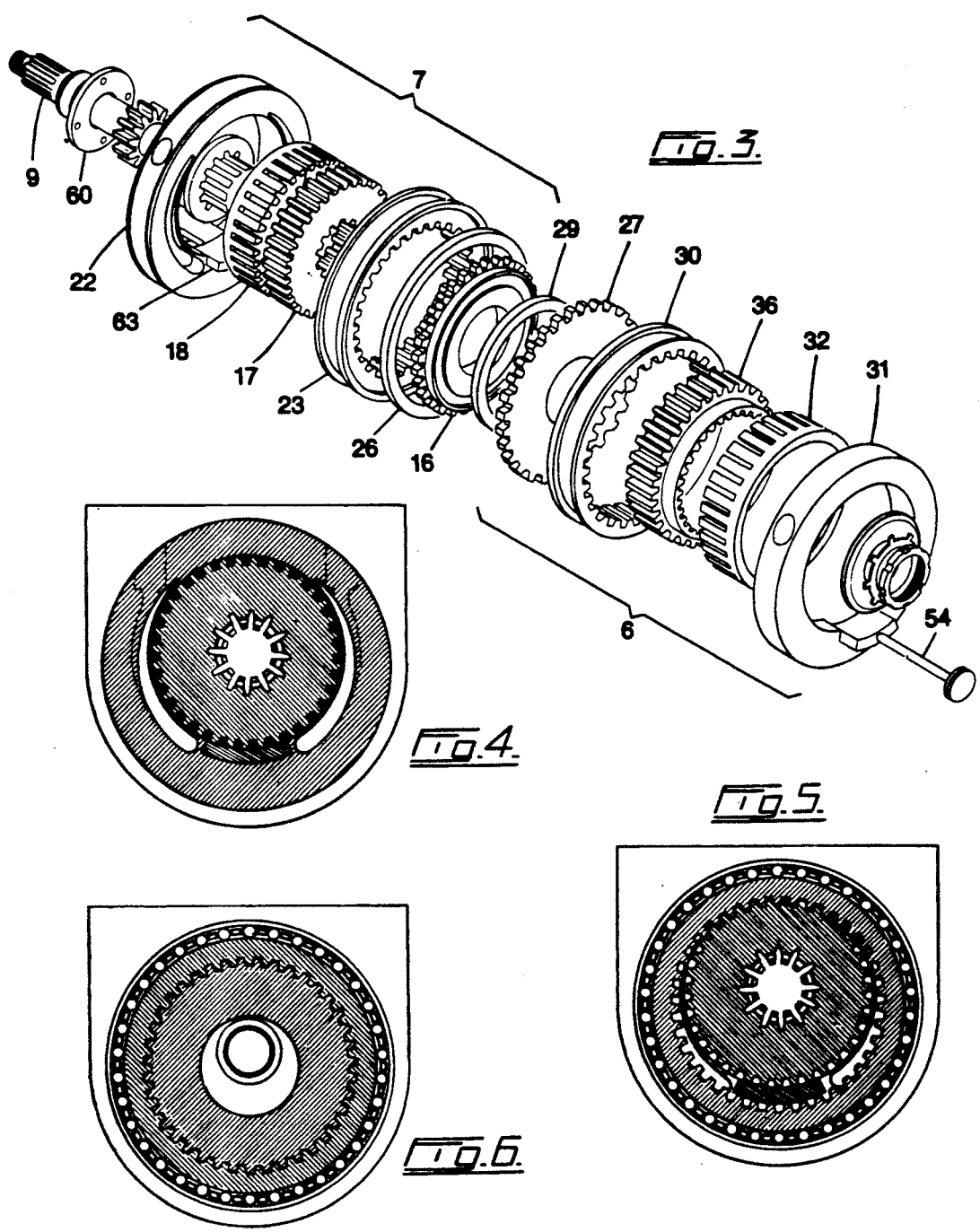

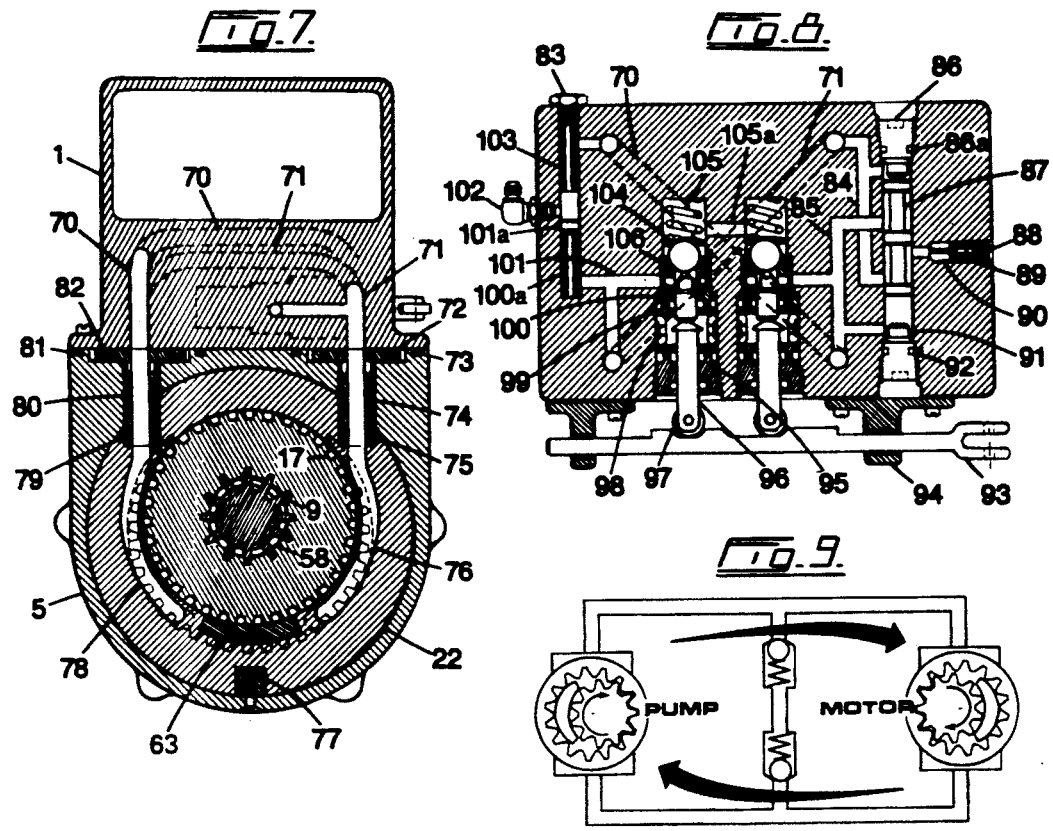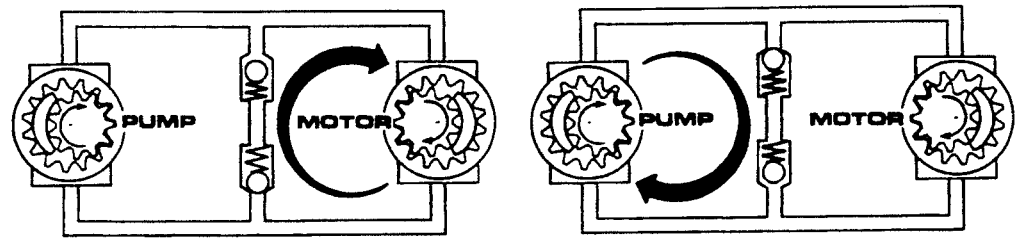

INTEGRATED HYDRO-MECHANICAL TRANSMISSION

BACKGROUND TO THE INVENTION

1. Field of the Invention

The present invention relates to an improved power transmission for use in armoured tanks and other military tracked vehicles, agricultural and industrial tracked vehicles, drive-wheel-steered agricultural and off-road vehicles, and other similar heavy duty applications. In particular, this transmission would be usable in any application wherein it is desirable, if not mandatory, to achieve a continuously variable output from maximum forward, through zero, to maximum reverse, and vice versa by means of a single control lever. Further, this continuously variable output must be achieved while the input drive—usually provided by a gasoline, diesel or gas turbine engine—is operating within a fairly narrow speed range, or even at a constant speed.

2. Description of the Related Art

Historically, many different approaches have been taken in resolving the requirement of matching the limitations of engine output speed and torque to the desired vehicle forward speed. From a strictly theoretical point of view, the most desirable transmission would be one having continuous variability throughout its full range. Many transmissions have been developed which achieve some range of continuous variability, and these may be broadly categorized as either continuously variable mechanical or fluid drives. The continuously variable fluid drives may be further classified as hydrostatic, hydrokinetic and hydroviscous, depending upon whether a hydraulic pump/motor combination, a torque converter, or the viscous effects of fluids are the primary elements used to achieve variability.

In most automotive applications employing automatic transmissions, the hydrokinetic method, or torque converter, is the most commonly used. While the hydrokinetic or torque converter based automatic transmission serves well enough in passenger automobile applications, it is not useable in tracked or drive-wheel-steered applications. Because the hydrokinetic drive primarily transmits torque, the output speed is not accurately controllable and, for this reason, hydrostatic rather than torque converter based transmissions are generally employed. However, hydrostatic transmissions fare poorly from the point of view of efficiency when compared to straight mechanical drives. Nonetheless, the more accurate control of output speed, which is characteristic of hydrostatic transmissions, makes them the transmission of choice in these applications.

From a purely functional point of view, the most desirable transmission for use in tracked or drive-wheel-steered vehicles would be one having continuous variability through its full operating range from maximum forward, through zero, to full reverse, and vice versa. As well, the output speed should be directly proportional to the positional displacement of the control lever to either side of neutral, and should not exhibit any tendency to freewheel unless selected to do so. The optimal transmission for these applications would be one capable of transmitting power with a level of efficiency closely approaching that of strictly mechanical types, and should have a high level of durability. As well, it should be capable of being packaged in a relatively small envelope size, and should ideally not require external cooling circuits or charge circuits, which are usually a requisite with current hydrostatic transmissions.

SUMMARY OF THE INVENTION

In the subject invention, the desired continuous, through-zero, variability is achieved by utilizing a unique variable-volume, gear-type, hydrostatic pump and motor combination arranged in a back-to-back configuration, and which are employed in conjunction with a sun and planetary gear set. In a sun and planetary gear set, it can readily be demonstrated that continuous, through-zero variability can be achieved from the output of one rotating element even if the other two rotating elements operate in a constant direction, provided that one of the input elements is made speed variable.

For instance, in a typical sun and planetary gear set, if the sun gear is rotated at a constant clockwise direction of, say, 1000 rpm, and if the plant carrier is rotated at a variable rate of, say, between 100 and 800 rpm, also in a clockwise direction, then the ring gear output will alternately operate from a maximum counterclockwise speed, through zero, to a maximum clockwise speed, as the planet carrier goes through its range from 100 to 800 rpm. Of course, the output range on either side of zero is dependent upon the relative gear ratios chosen; nonetheless, the basic principle applies that a continuous through zero output can be achieved by judiciously deploying a sun and planetary gear set, provided that at least one input element is made variable.

In the subject invention, the requisite variability in rotation of one input element of a sun and planetary gear set is achieved by spline-coupling the output of a variable-volume hydrostatic motor to the planet carrier of a sun and planetary gear set. The sun gear, which comprises the other input to the gear set, is driven by the same main input shaft that drives the hydrostatic pump, and which passes through the center of the pump and motor. The hydrostatic pump and motor are internal gear types, with crescents separating the rotating elements, and are arranged such that the internal gears can be moved axially such as to engage a greater or lesser portion of the respective external gears. Each set of gear elements is capped in such a way that fluid is prevented from escaping out either end. Since the pump and motor elements are arranged in a back-to-back configuration, when the volumetric capacity of the pump is made to increase, that of the motor decreases, and vice versa. Since the pump and motor are hydraulically coupled in a closed-loop fluid path, the net result is that the motor rotating elements are made selectively speed variable even with the pump operating at a constant speed.

Since the pump and motor combination operate in concert with a sun and planetary gear set—the ring gear being the output of the transmission—continuous, through-zero variability is achieved, even though neither the pump nor the motor changes rotary direction. Indeed, it isn't even necessary, or desirable, for the pump or motor rotating elements to disengage in order to achieve the zero output mode of the transmission as a whole. In fact, at the neutral or zero output transmission mode, the fluid flow volume in the pump and motor is near the mid point. Since conventional internal gear-type pumps exhibit poor efficiency at very low fluid volumes, but achieve efficiencies as high as 93 percent or higher at higher levels of flow, this relatively high flow level at zero transmission output is highly desirable.

While we can expect an efficiency level somewhere in the order of 90 percent, or better, from conventional internal gear type hydrostatic pumps, a number of measures have been taken in this transmission to further increase the efficiency of the hydraulic elements. This includes the use of pressure balancing of the rotating elements; elimination of sliding friction by the use of ball or roller bearings at every possible friction surface; and by using special, low-friction, carbon-graphite materials for the rotating element plugs. As well, the external fluid path between the pump and motor is configured such that there are no sharp turns or other impediments to fluid flow.

In addition to the measures taken to enhance the efficiency of the hydrostatic elements, the mere fact that, of the two rotating inputs to the sun and planetary gear set, one is a direct mechanical coupling, further increasing the efficiency. The resulting overall efficiency of the transmission is, thus, significantly greater than that which would be achieved by the hydrostatic elements alone. For the transmission, as a whole, a level of efficiency in excess of 95 percent is expected.

Most practical transmission applications, including drive-wheel-steered vehicles, generally demand that a positive neutral, or decoupled mode, be achievable. As well, in some applications, it is desirable that a free-wheeling condition be achievable in one or both directions. These functional requirements are met by using two large externally selectable ball valves arranged hydraulically in a back-to-back configuration. This means that the transmission can be placed in the neutral, the freewheeling (either direction), or in the controlled-output modes without the addition of a mechanical clutching mechanism.

An additional feature of the transmission, and one which is a natural consequence of the back-to-back pump and motor arrangement, is integral downshifting in response to applied load. This integral downshifting is achieved by making the cross-sectional area of the motor working chamber of a larger size than that of the pump. This difference in size of the two working chambers results in a differential force acting laterally on the internal gear elements, and will tend to cause a downshifting effect. This downshifting, however, is in one direction only and is of primary use of heavy duty applications where the load is always in one direction. It should further be understood that such integral downshifting would not be a desirable feature in tracked or drive-wheel-steered vehicles, but it is a desirable feature in certain particular applications of this transmission.

While the subject hydro-mechanical transmission incorporates the means for operator selection of either the freewheeling or controlled output modes, in tracked and drive-wheel-steered vehicles, the direct replication of output speed in response to input control lever position is the most important functional characteristic. What this means, in practical applications, is that when the vehicle is negotiating a turn, the transmission acts as a dynamic brake, limiting the rate of rotation of the inside wheel of the vehicle to that speed as selected by the operator. In fact, the direction of rotation of the inside wheel can be slowed down, stopped, or driven into reverse without the use of wheel brakes. This exact control of drive wheel output speeds relative to one another is very important in tracked and drive-wheel-steered applications.

BRIEF DESCRIPTION OF THE DRAWINGS

FIG. 2 is a cross-sectional view taken through the centerline of the main transmission housing, but with the mode selector assembly 1, FIG. 1 removed.

FIG. 3 is an exploded view showing the interrelationship of parts comprising the hydrostatic pump 7 and hydrostatic motor 6.

FIG. 4 is a cutting plane taken through Section 4—4 of FIG. 2.

FIG. 5 is a cutting plane taken through Section 5—5 of FIG. 2.

FIG. 6 is a cutting plane taken through Section 6—6 of FIG. 2.

FIG. 7 is a vertical cross-sectional view taken along Section 7—7 of FIG. 1 and illustrates the fluid passages which direct fluid into and out of the hydrostatic pump.

FIG. 8 is a horizontal cross-sectional view taken along Section 8—8 of FIG. 1 and illustrates two selectable non-return valves in a back-to-back configuration and located hydraulically between the fluid paths which interconnect the hydrostatic pump and motor.

FIGS. 9, 10 and 11 illustrate schematically the fluid flow conditions when both valves are closed and when one or the other valve is held unseated.

DESCRIPTION OF THE PREFERRED EMBODIMENT

Figure 1:
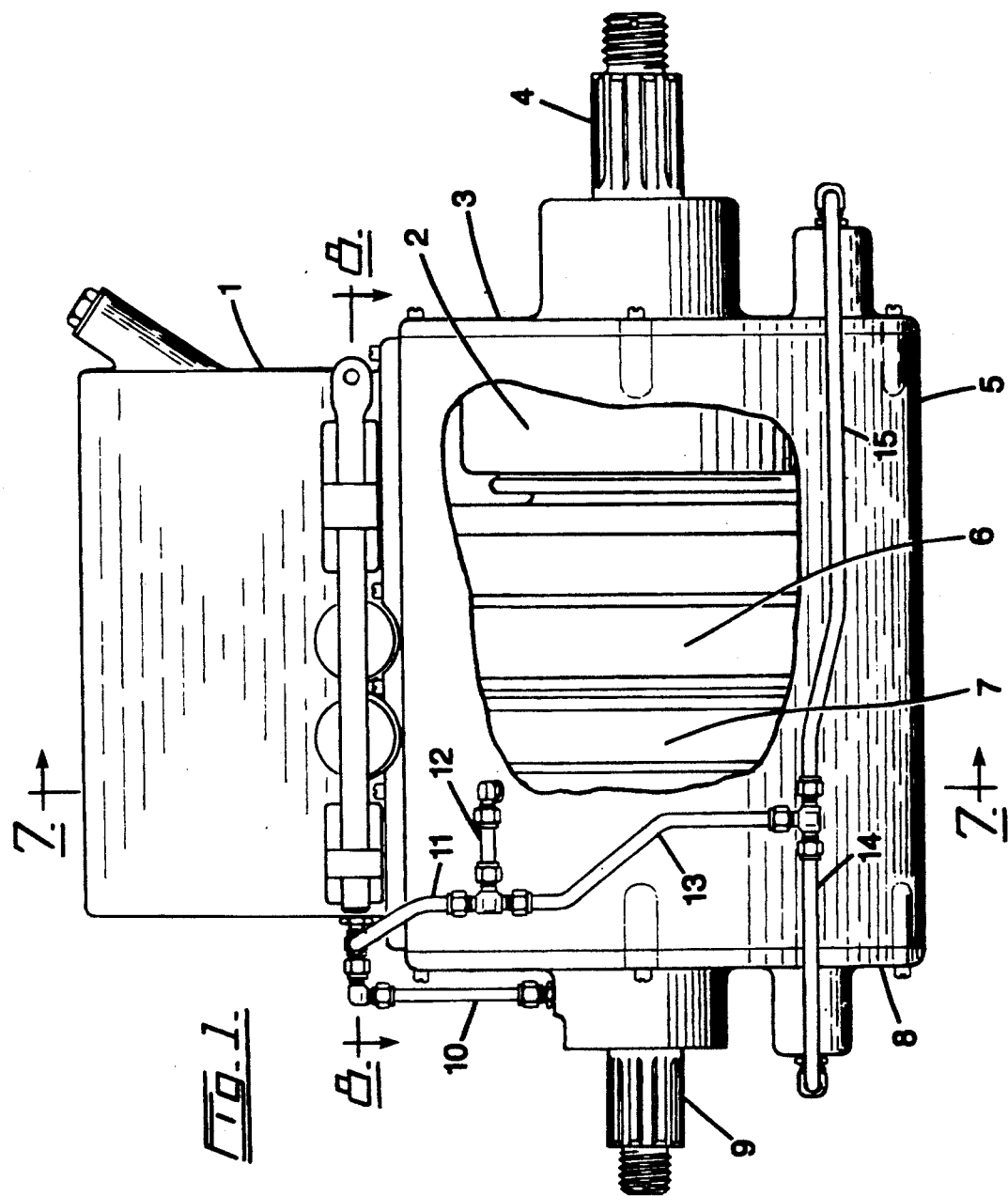
FIG. 1 is an external view of the transmission and includes a partial cutaway showing the relative location of the main internal elements.

Referring specifically to FIG. 1, this figure illustrates the overall configuration of the transmission. This figure also includes a partial cutaway showing the relative location of the primary operating components of the transmission which consist of the hydrostatic pump 7, the hydrostatic motor 6, and the sun and planetary gear set 2. These primary operating components are housed inside the main transmission housing 5. Housing end caps 4 and 8 serve to support input shaft 9 and output shaft 4, respectively, and also serve to oil-seal the internal elements which are immersed in oil. The mode selector assembly 1, which is illustrated in further detail in FIGS. 7 and 8, serves to permit selection of the various operating modes of the transmission. The external hydraulic pipes 10, 11, 12, 13, 14 and 15 serve to direct pressure fluid to the various internal rotating elements that are pressure-balanced.

Referring next to FIG. 2, items 16 through 36 comprise the main elements of a variable-volume, internal-gear-type hydrostatic pump and motor which are mounted in a back-to-back arrangement such that when the volumetric capacity of the pump increases, that of the motor decreases, and vice versa, with the result that the motor speed varies with respect to that of the pump. Items 23 and 30 are the respective outer gears of the pump and motor. Pump housing 22 abuts against the pump ring gear 23 at the forward end, and serves to house the inner gear 17 and inner gear plug 18. It also incorporates two fluid channels which serve to direct fluid into and out of the working chambers of the pump.

Pump housing 22 and motor housing 31 are held stationary, and are constrained axially at the forward end by nut 21 and by spacer 37 at the aft end. Pump outer gear 23 and motor outer gear 30 are held in position radially by means of rollers 24 and 28 and are separated by means of axial thrust bearing 26. The length of the bearing outer race 25 is made slightly less than the combined axial dimension of the pump and motor ring gears 23 and 30 and bearing 26 so that bearing 26 takes up any axial thrust loading between the two outer gears. The motor inner gear plug 32, bearing 35, and collar 34 perform the same functions as the similar pump parts 17, 19 and 20.

The inner gear plug 18 is constrained laterally in the circular inside bore of the pump housing. At the rearward end it partially abuts against the side of the pump ring gear 23, except at the bottom, where the ring gear and inner gear are not in mesh. At the forward end, the inner gear plug is axially constrained by means of axial thrust bearing 19 and collar 20. The inner gear plug performs four very critical functions. Firstly, it comprises a series of plugs, one for each inter-tooth channel, and which prevents fluid from escaping out between the gear teeth. Secondly, it permits the inner gear to be moved to different axial positions, thereby causing a greater or lesser portion of the inner gear teeth to be in engagement with the ring gear. Thirdly, it serves as a radial bearing surface for the inner gear, preventing it from binding against the inside diameter of the housing under extreme load conditions. Fourthly, it serves as the forward stop for the internal gear, which is necessary to prevent inadvertent disengagement of the inner gear from the ring gear. If disengagement were permitted, subsequent re-engagement of the gears would be difficult, if not impossible during operation.

In order to provide very close conformance to the gear teeth, and to still permit the inner gear to be repositioned axially without hanging up, the inner gear plug is fabricated by the injection moulding process, the inner gear being employed as an integral part of the mould while the plug is being formed. In order to provide the lubricating qualities required, the material used would be either one of the modern carbon-graphite, fibre-impregnated materials or else aluminum or phosphor-bronze coated with a solid film lubricant after injection moulding is complete. Once fabricated, the inner gear and inner gear plug become a matched set. The aft end of the pump working chamber is capped off by outer gear plug 16. The outer gear plug 16 is similarly fabricated by injection moulding using outer gear 23 as part of the mould and, once formed, these parts also become a matched set. The outer gear plug abuts against the aft face of inner gear 16, and serves to cap off the aft side of the pump fluid working chambers.

Items 27 through 36 form the corresponding parts of the variable volume hydrostatic motor. The motor is similar to the pump in all respects except that the pump inner gear 36 incorporates splines that intermesh with splines on planet carrier 40 such that torque can be transferred from inner gear 26 to planet carrier 40, yet permitting the inner gear to be repositioned axially. The inner rotary elements of the pump and motor, and consisting of items 16, 17, 27 and 36 are held sandwiched together by means of input control hub 60, control shaft 58, thrust plate 57 and nut 56. Control shaft 58 incorporates splined cutouts in the forward end which are coincident with similar splines on the pump inner gear 17. The input control hub 60, and control shaft 58, are bolted to the pump inner gear 17. The splines on the inside diameter of the pump inner gear mesh with mating splines on the input shaft through the cutouts in the control shaft in such a way that these rotating elements can be repositioned axially, as a unit, by means of the input collar 68 and bearing 69. The pump outer gear plug 16 and motor outer gear plug 27, which rotate at differing rates, are held separated by axial thrust bearing 29.

Because the inner rotating elements of the back-to-back pump and motor unit are repositioned axially to vary the respective volumetric capacities of the pump and motor, it is also a requisite that the respective pump and motor crescents 63 and 54 also be capable of being repositioned axially such that they always remain abutted against outer gear plugs 16 and 27. This is achieved by means of pistons 62 and 51a which are integral with the respective crescents, and which slide in mating cylinder bores which are integral with end caps 3 and 8 respectively. Items 51 and 64 are O-ring seals and the chambers inside the cylinders are pressurized to ensure positive seating of the crescents at all times. Compression springs 50 and 65 serve to ensure seating of the crescents when there is no pressure in either working chamber. Pressure is supplied to these chambers from the fluid crossover channels in the mode selector assembly (Ref. FIG. 8) via elbows 49 and 66, and which will be described later. Items 52 and 61 are O-ring seals which seal the splitline between the main housing 5 and end caps 3 and 8.

Items 38 through 42 are the main components of a sun and planetary gear set. Ring gear 38 is integral with output shaft 4 and is constrained in and cap 3 by means of bearings 46 and 47 and spacer 43. Input shaft 9 is constrained at the forward end by bearing 67, and at the aft end by bearing 48. Sun gear 42 is spline-mounted on the input shaft and meshes with planet gears 39. The planet gears 39 are held in planet carrier 44 by means of shafts 41, and the planet carrier is bearing-mounted on input shaft 9 by means of bearing 55. Fluid sealing is achieved at the aft end by means of seals 44 and 45, and at the forward end by means of seals 136 and 139 (see FIG. 12).

Referring to FIG. 3, this drawing graphically illustrates the interrelationship of the main components comprising the hydrostatic pump 7 and motor 6. Inner gear plug 18 is housed inside the internal bore in the pump housing 22. While it is free to rotate within the housing it is constrained from axial movement by means of a bearing at its front end, and by virtue of the fact that it abuts directly against the front face of external gear 23 at its aft end. External gear 23 is bearing mounted within the transmission housing and is free to rotate but is axially constrained at its forward end by inner gear housing 22, and at its aft end by bearing 26. Inner gear 17 is housed inside inner gear plug 18 and, while the inner gear plug is made to closely conform to the gear tooth cutouts, the internal gear can both rotate and be repositoned axially. Outer gear plug 16 is similarly made such that its teeth very closely confoirm to the teeth cutouts of external gear 23 and abuts against the aft face of internal gear 17. It can, thus, be seen that the axial length of the working chambers within the pump can be made variable by an axial repositioning of internal gear 17 and outer gear plug 16. The hydrostatic motor 6 is similar to the pump, except that as the pump internal working chamber is increased, that of the motor is decreased.

Referring to FIG. 4, 5 and 6, FIG. 4 is a cutting plane looking forward through the main body of the transmission at the interface between the pump housing 22 and external gear 23. This sectional view illustrates that the only possible fluid paths towards the front are those that lead out, through the fluid channels toward the top, and into the mode selector assembly. FIG. 5 is a cutting plane through the working chamber of the pump and shows that the working chamber, other than being axially variable in size, is essentially the same as in a conventional gear-type hydraulic pump. FIG. 6 is a cutting plane looking aft at the interface between the inner gear 17 and outer gear plug 16, and similarly illustrates that any possible fluid path to the rear is capped off by means of the outer gear plug.

Because the hydrostatic pump and motor inner gear housings are circular and are held within a bore in the main transmission housing, some suitable means must be provided to prevent the inner gear housing from rotating, and also to be able to direct fluid through the main transmission casing and into and out of the pump and motor elements. Referring to FIG. 7, item 77 is a positioning block which prevents pump housing 22 from rotating, but allows it to move axially a small amount as necessary to compensate for wear in the rotating elements. Wasted plugs 74 and 80 each have a large collar which contains a seal groove which design permits a small amount of lateral repositioning of the plugs without impairing fluid seal requirements. During operation, fluid that is discharged by the pump elements is discharged via the internal fluid channel 78, through waisted plug 80 and thence via crossover channel 70 into the inlet side of the motor. Fluid returning from the motor is directed via crossover channel 71, waisted plug 74 and internal fluid channel 76. Items 72, 73, 75, 79, 81 and 82 are O-ring seals used to prevent fluid leakage. The fluid flow path details in the motor are similar in all respects to those of the pump.

Referring to FIG. 8, the two large ball-type selector valves are configured hydraulically in a back-to-back arrangement between the two fluid paths connecting the hydrostatic pump and motor, and are used to select the four possible transmission modes by selectively shunting fluid between these crossover paths as follows:
a) lockup, with both valves seated and no fluid shunted, as illustrated in FIG. 9, and wherein the output is fully controlled by the position of the input control lever;
b) forward freewheeling, with upper valve held unseated as shown in FIG. 10, and wherein the motor is over-running the pump;
c) reverse freewheeling, with lower valve held unseated as shown in FIG. 11 and, wherein the pump is over-running the motor; and
d) neutral, with both valves held unseated and fluid is freely shunted in either direction.

With reference to FIG. 8, the left hand selector valve comprises ball 104, spring 105, ball seat 106, ball lifter 100, sleeve 99, spacer 98, slider 96 and cam follower 97. Selector 93 slides in mounting brackets 94 and contains raised cam positions that permit both valves to be closed (locked position) as shown in FIG. 9 or either of the two positions shown in FIGS. 10 and 11. The right hand valve is similar to the left hand one in all respects.

In FIG. 8, shuttle piston 101a and spacers 100a and 103, along with associated drillings form a shuttle valve which ensures that the various internal elements which require pressure balancing receive pressure fluid from whichever fluid crossover channel, 70 or 71, is pressurized at any given time. This pressure fluid is directed via fitting 102 and external hydraulic pipes 10, 11, 12, 13, 14 and 15 to those internal elements that are pressure balanced. Cap 83 blocks off the drilling which houses the shuttle valve.

Since the hydrostatic pump and motor are operated in a closed circuit, some means must be provided to replenish any fluid lost due to leakage, as well as to add or subtract a small quantity of fluid when ratio changes are made in instances wherein the pump and motor have a changing relative volumetric capacity with linear movement of the inner working elements (i.e. downshifting capability). This requirement is met by the dual-acting shuttle valve 87. This valve is so constructed that, whichever fluid crossover path is under pressure at any given time, a fluid path will be open from the reservoir through drilling 89, fluid restrictor 90, and thence into the low-pressure fluid crossover path via internal drillings. The purpose of the fluid restrictor is to ensure that the shuttle valve is properly repositioned when pressure is felt in either crossover path. Movement of the shuttle valve is restricted by plugs 86 and 92. Item 88 is a plug that caps off the internal drilling which houses fluid restrictor 90.

Figure 12:
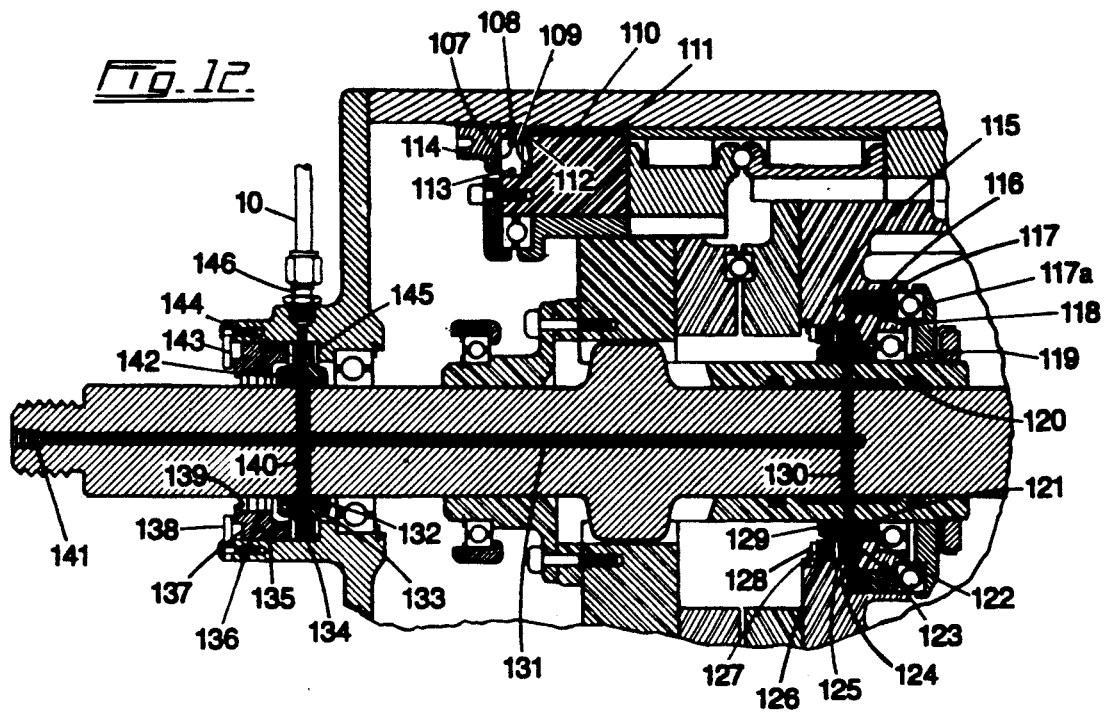
FIG. 12 is an enlarged view of the upper front portion of the main transmission housing and illustrates those components that serve to accomplish pressure balance in the outer and inner rotating elements of the hydrostatic pump and motor.
Figure 13:
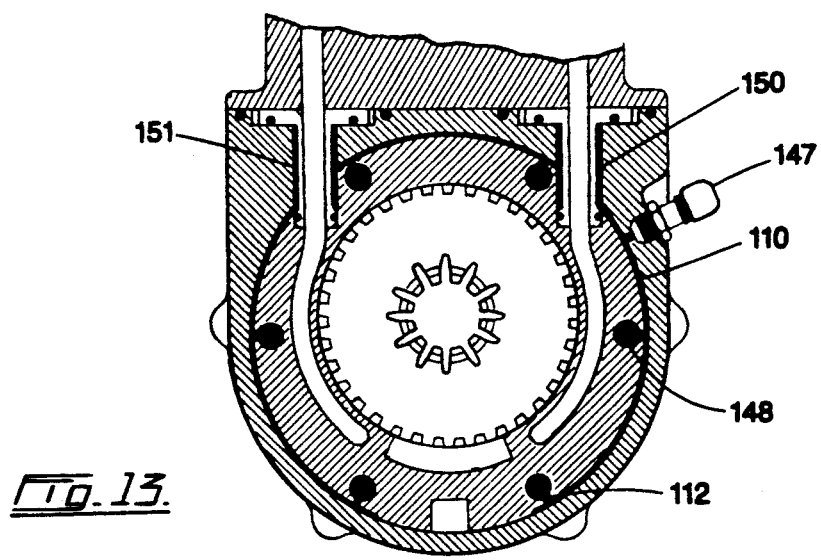
FIG. 13 is a partial cross-sectional view illustrating the pressure balance fluid paths for the outer rotating elements.

Referring to FIGS. 12 and 13, which illustrate in detail the fluid paths of the internal pressure balance circuits, FIG. 12 is an enlarged view of the upper front portion of the main transmission housing, and illustrates those components that serve to accomplish pressure balance in the internal and external rotating elements of the hydrostatic pump and motor, while FIG. 13 is a partial cross-sectional view similar to that shown in FIG. 7. These figures need to be considered together and, in each instance, the pressure balance fluid path is shown in black. During operation, fluid pressure is directed from the relevant crossover channel within the mode selector assembly via the shuttle valve and fitting 102 (FIG. 8), tube 10 (FIG. 1) and internal drillings 142 in forward seal carrier ring 133, internal drilling 140, 131 and 130 in input shaft 9, and thence through drillings 122 in aft seal carrier ring 115 to exert a compensating force against the forward face of toroidal-shaped piston 117 and bearing 117a. This force is just slightly greater than that exerted by the fluid working chambers, and which tends to force the internal rotating elements apart. This counterbalancing force serves to minimize fluid leakage by forcing the working elements together, while, at the same time, compensating for wear in the rotating parts. As well, this provision eliminates any requirement for pre-loading of the working parts, thereby reducing frictional loads. Fluid leakage is prevented by means of carbon rubbing seals 123, 125, 144 and 145. The carbon rubbing seals are held firmly against the carrier rings by means of stationary seal carriers 127 and 137 and shim rings 128 and 143. Plate 138 serves to hold the forward seal components in place. Items 116, 118, 120, 121, 126, 129, 132, 134 and 135 are O-ring seals. Item 139 is a conventional shaft seal set. Bearing 119 serves to take up any sideways deflection of the main shaft 9 by transferring loading to the motor inner gear 36 which, in turn, is radially constrained by the motor inner gear plug 32.

The pressure balancing of the outer rotating elements is provided via a series of equally spaced small pistons 107 which are housed in drillings in the forward portion of the pump housing 22 (FIG. 2) or, alternately by a single toroidal-shaped piston. Pressure fluid from the shuttle valve is directed via hydraulic pipes 11 and 12 (FIG. 1), fitting 147, and thence via a waisted portion 110 around the periphery of the pump housing 22, and fluid passages 112, and waisted portions 150 and 151 of plugs 74 and 80 to pressurize piston chambers 148 (see FIG. 13). O-ring seals 108 and 111 prevent fluid leakage between the pump housing 22 and main transmission housing 5. O-ring seals 113 and 114 prevent leakage from the pistons. Cup spring 109 provides initial seating of the rotating elements before pressure balance becomes effective. The pressure balance provision of the outer rotating elements serves the same purpose as for the inner rotating elements.

Figure 14:
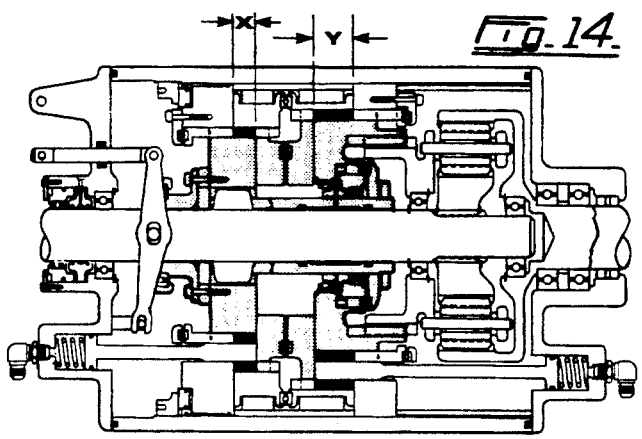
FIGS. 14, 16 and 18 illustrate the axial positioning of the inner rotating elements at the 'neutral', 'full forward' and 'full reverse' conditions.
Figure 15:
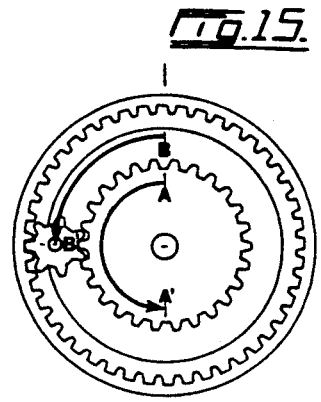
FIGS. 15, 17 and 19 graphically illustrate the corresponding rotation of the sun and planetary gears at the respective 'neutral', 'full forward' and 'full reverse' positions of the inner rotating elements.
Figure 16:
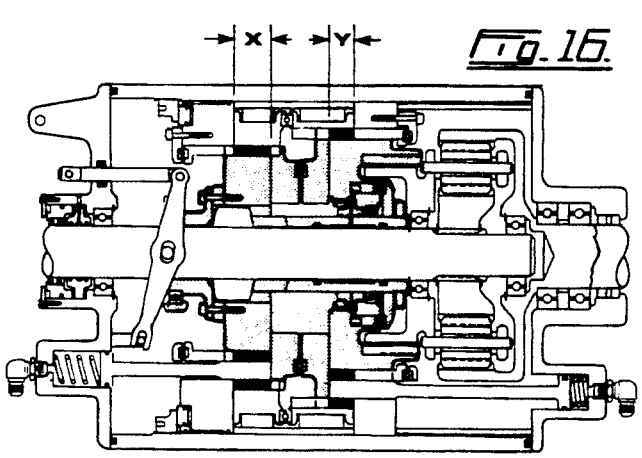
Figure 17:
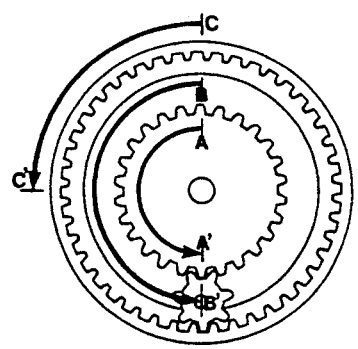
Figure 18:
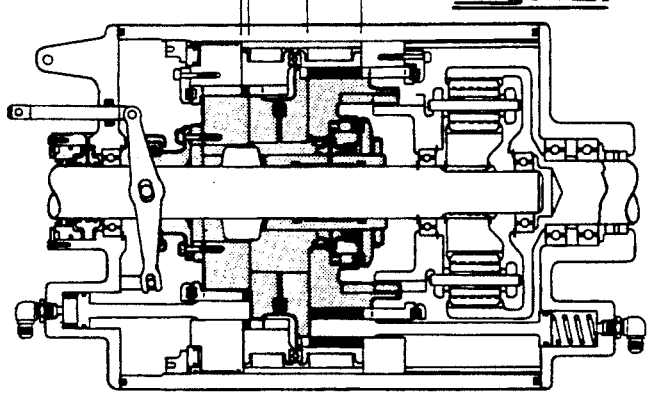
Figure 19:
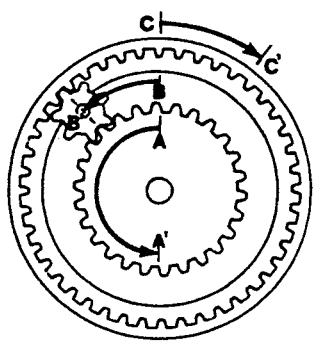

FIGS. 14, 16 and 18 illustrate the axial positioning of the inner rotating elements at the 'neutral', 'full forward' and 'full reverse' conditions. FIGS. 15, 17 and 19 graphically illustrate the corresponding rotation of the sun and planet gear elements at the respective neutral, full forward and full reverse positions of the inner working elements.

To gain an understanding of how the output from the ring gear can be zero when the motor is operating, consider that the ring gear is held stationary, while the sun gear is rotated through 180 degrees, as shown in FIG. 15. In this instance, the planet carrier will rotate through an arc of about 90 degrees (depending upon the relative gear ratios chosen for the sun and planet gears). If, instead of holding the ring gear stationary while the planet gear is rotated through 180 degrees, the planet carrier is rotated through the arc as described above, then the output from the ring gear will be zero. It follows then that if the sun gear is rotated at 2000 rpm, zero output of the transmission will occur if the planet carrier is rotated in the order of about 900 rpm—depending, of course, upon the actual gear ratios chosen. This is the condition shown in FIGS. 14 and 15.

It is important to note that the hydrostatic pump rotates at the same rate as the sun gear, thus, in order to achieve the required motor speed of about 900 rpm at zero output, the working chamber of the motor must be approximately twice as large as that of the pump at the operating mid point. This requirement is easily met in one of three possible ways—or a combination of all three. These ways are:
i) by making the motor of a larger relative diameter than that of the pump;
ii) by making the working chamber of the pump deeper in the axial direction than that of the pump; or
iii) by making the gear teeth of the motor larger than those of the pump.

In FIG. 2 all three methods are used for purposes of illustration only.

Next, consider the condition as illustrated in FIG. 16, wherein the internal working elements are moved the maximum amount to the right. This results in a larger working chamber in the pump and a correspondingly smaller working chamber in the motor. Since the working chamber of the motor is now smaller, but the fluid volume delivered to it is greater, the net result is that the motor rotates at an increased speed—albeit in the same direction as before. With the planet carrier thereby rotating at a greater speed, as represented by B—B' in FIG. 17, the ring gear output is in the forward direction and is graphically illustrated as arc C—C'. Thus, if the arc A—A' of the sun gear represents an input speed of 2000 rpm, then the output from the transmission would be roughly 1000 rpm in the same direction as the input.

Conversely, if the internal rotating elements are moved the maximum amount to the left, as shown in FIG. 18, then the working chamber in the pump is now at its smallest, and that of the motor is largest. This results in a rotational speed in the planet carrier less than that at the neutral or zero output position, as represented by arc B—B' in FIG. 19. The net result is a reversal of direction of the ring gear, and is illustrated graphically by arc C—C'. In all positions between the full forward and full reverse, the output will be an intermediate value and will be directly proportional to the input control lever position, and will be continuously variable from full forward, through zero, to full reverse.

In instances where the motor is either made of a larger diameter or of larger tooth profile (or both), the internal working elements will tend to shift towards the left as shown in FIGS. 14 through 18 due to the differential forces felt in the two working chambers. This results in an automatic built-in downshifting whenever heavy loads are felt. In applications where downshifting is not desired, the motor diameter and tooth profile would be the same as that of the pump.

I claim:

1. A hydrostatic transmission incorporating gear-type hydraulic pump and motor elements; the hydraulic pump and motor each being of the internal gear type, wherein said hydraulic pump and motor each have an internal gear, an external gear and a crescent that separates the respective internal gear and external gear; the internal gears being capped off by means of laterally constrained and rotatably supported internal gear plugs, and the external gears being capped off by means of external gear plugs sandwiched between the two internal gears creating respective pump and motor working chambers; the internal gears and associated external gear plugs being laterally moveable by means of a concentrically-spanned control shaft which is positionally displaceable in an axial direction causing the internal gears to engage a greater or lesser portion of the respective laterally-constrained external gears such that the volumetric capacity of both pump and motor working chambers are made inversely variable to one another; the internal gear of the pump portion of said hydrostatic transmission being spline-coupled and driven via a support input shaft, said support input shaft also being spline coupled to a sun gear of a sun and planetary gear set; the internal gear of the motor portion of said hydrostatic transmission being spline coupled to a planet carrier of said sun and planetary gear set; the motor element of said hydrostatic transmission being coupled hydraulically to the pump element such that it rotates in the same direction as the pump but at a generally slower speed; gear ratios of said sun and planetary gear set being chosen in conjunction with the relative volumetric capacities of said hydraulic pump and motor elements such as to achieve a continuously variable, through zero output; and an output shaft being integral with a ring gear of the sun and planetary gear set.

2. The device according to claim 1 wherein the motor element of said hydrostatic transmission is hydraulically coupled to the pump element by means of two non-restrictive primary fluid flow crossover paths taken external to the transmission casing; said primary fluid flow crossover paths being selectably shunted in either direction by means of two controllable non-return valves hydraulically situated in a back-to-back configuration in a shunt path between the two primary fluid flow crossover paths; said non-return valves being selectably held unseated by means of a cam slider mechanism, so configured that progressive lateral repositioning of said slider mechanism will cause the transmission to be operably functional in several selected modes, to whit:

a) controlled output wherein both non-return valves are allowed to remain seated, whereupon no fluid is shunted between the two primary fluid flow crossover paths and the output of the transmission throughout the full operating range is directly porportional to the selective positioning of an input control lever;
   b) unidirectional freewheeling in a forward direction wherein one valve is held unseated;
   c) unidirectional freewheeling in a reverse direction wherein the other valve is held unseated; and
   d) the neutral position wherein both valves are held unseated and fluid may be shunted unrestrictedly in either direction between the two primary fluid flow crossover paths.

3. The device according to claim 1 incorporating gear-type hydraulic pump and motor elements wherein the cross-sectional area of the fluid under pressure within the motor element working chamber may be made optionally larger than that of the pump element working chamber; this differential working fluid cross-sectional area being achieved either by choosing a larger diameter external gear in the motor element with respect to the pump, or by choosing a larger-sized tooth profile in the motor in comparison to that of the pump element, or a combination thereof; this differential working fluid cross-sectional area operating in conjunction with the fluid pressure increases felt within the working fluid chambers in response to the torque loading acting on the transmission output shaft in response to applied load, such as to cause an unbalanced differential force to act axially on the pump and motor internal gear elements and thereby tending to induce a downshifting action of the concentrically spanned control shaft and consequent downshift-inducing force acting against the input control lever.

4. The device according to claim 1 which incorporates a means for hydraulic counterbalancing of the hydrostatic forces acting within the pump and motor element working chambers and which tend to thrust the pump and motor external gears axially away from their seated position against their respective internal gear housings; this counterbalancing force being supplied from that primary fluid flow crossover path having the higher pressure at any given instance; this pressure fluid being selectively directed via a shuttle valve, and thence by means of external piping and internal drillings through the main transmission body, and thence via a waisted portion circumscribing the periphery of the pump element internal gear housing and thence by internal drillings within the internal gear housing to the working pressure chamber of a counterbalancing actuator; said counterbalancing actuator comprising a single toroidally-shaped piston, or optionally a series of small circular pistons, in either case the piston(s) being housed in a mating bore or bores within the front face of the pump element internal gear housing, and being so arranged such that the piston(s) abut against an adjuster nut held positionally affixed within the body of the main transmission housing; this counterbalancing force being proportional to, but incrementally greater than, the applied axial force resulting from the pressures in the pump and motor internal working chambers; said counterbalancing force being desirable as a means of compensating for end wear on the pump and motor element external gears and mating internal gear housings, as a means of reducing the frictional force acting on said pump and motor element external gears to near zero at such times as the transmission is in neutral, and as a means of reducing such friction to the minimum possible level during normal operation.

5. The device according to claim 1 which incorporates a means for hydraulically counterbalancing the hydrostatic forces acting within the pump and motor element working chambers which tend to thrust the two external gear plugs away from their seated positions against the respective pump and motor internal gears; this counterbalancing force being supplied from that primary fluid flow crossover path having the higher pressure at any given instance; this pressure fluid being selectively directed via a shuttle valve, which may be the same as that in claim 4; this pressure fluid being thence directed via external piping to a fitting on a front end cap of the main transmission housing, thence by means of a drilling in the end cap and between the elements of a double rotating oil seal; thereinafter through radial and axial drillings within the support input shaft; thence outwards through radial drillings in the support input shaft, thence via a sealed and waisted portion of the control shaft, thence between the elements of a double rotating oil seal, and thereinafter through radial drillings to the working pressure chamber of a counterbalancing actuator; said counterbalancing actuator comprising a toroidally-shaped piston housed within a mating bore within the rear face of the motor element internal gear, and being so arranged such that the piston abuts against a thrust plate on the end of the control shaft; said counterbalancing force being porportional to, but incrementally greater than, the applied axial force tending to thrust the external gear plugs away from contact with the thrust faces on the internal gears; said counterbalancing force being desirable as a means of compensating for wear on the mating thrust faces of the internal gears and external gear plugs, as a means of reducing the frictional forces acting on said thrust faces to near zero at such times as the transmission is in neutral, and as a means of reducing said sliding friction to the minimum possible level during normal operation.

6. The device according to claim 1 which incorporates positionally-displaceable pump and motor element crescents which are hydraulically counterbalanced against fluid pressures within the working chambers of the pump and motor elements; such hydraulic counterbalancing being provided by a piston integral with each crescent, said piston being housed in a bore within the respective main transmission casing end caps; said pistons being spring loaded and configured in such manner as to enable them to move in concert with the externally-controlable pump and motor internal gears as they are repositioned axially during operation to effect ratio changes in output versus input, yet remaining in positional contact with their respective external gear plugs at all times; said hydraulic counterbalancing being achieved via the same shuttle valve as provides hydraulic counter-balancing as in claims 4 and 5.

7. The device according to claim 1 which incorporates means for hydraulic pump and motor fluid replenishment by means of a dual purpose shuttle valve configured such that any fluid seepage from the hydraulic pump or motor element, or any required capacity change in total volume of hydraulic fluid within the pump and motor element internal working chambers caused by downshifting in a transmission so equipped, is automatically added to that primary fluid flow crossover path being in a fluid deficit situation.

8. The device according to claim 1 wherein the hydraulic pump and motor element internal gear housings each incorporate internal fluid flow passages, the innermost openings of which are in lateral juxtaposition to the working chambers on either side of the pump and motor crescents; said fluid flow passages thence being directed inward and upwards towards the outer circumference of the respective internal gear housings whereupon they become contiguous with mating drillings in corresponding waisted plugs which incorporate a large-diameter collar; said waisted plugs serving to permit a slight lateral movement of the pump and motor internal gear housings due to wear, as well as to accommodate any buildup of manufacturing tolerances; said waisted plugs also serving to permit an unrestricted fluid flow path around the periphery of the pump element internal gear housing for transmission of pressure balance fluid.

* * * * *